US009289095B2

(12) United States Patent
Goff, IV

(10) Patent No.: US 9,289,095 B2
(45) Date of Patent: Mar. 22, 2016

(54) CHARCOAL GRILLING APPARATUS AND METHODS

(71) Applicant: Ben Douglas Goff, IV, Winchester, KY (US)

(72) Inventor: Ben Douglas Goff, IV, Winchester, KY (US)

(*) Notice: Subject to any disclaimer, the term of this patent is extended or adjusted under 35 U.S.C. 154(b) by 244 days.

(21) Appl. No.: 13/951,952

(22) Filed: Jul. 26, 2013

(65) Prior Publication Data
US 2014/0026766 A1 Jan. 30, 2014

Related U.S. Application Data

(60) Provisional application No. 61/677,247, filed on Jul. 30, 2012.

(51) Int. Cl.
*A47J 37/00* (2006.01)
*A47J 37/07* (2006.01)
*A47J 36/06* (2006.01)
*A47J 36/12* (2006.01)

(52) U.S. Cl.
CPC .............. *A47J 37/07* (2013.01); *A47J 37/0704* (2013.01); *A47J 37/079* (2013.01); *A47J 37/0763* (2013.01); *A47J 37/0786* (2013.01); *A47J 36/06* (2013.01); *A47J 36/12* (2013.01)

(58) Field of Classification Search
CPC .. A47J 37/0704; A47J 37/079; A47J 37/0763
USPC .......................... 99/450, 449; 126/25 R, 25 B
See application file for complete search history.

(56) References Cited

U.S. PATENT DOCUMENTS

| 2,250,729 | A | * | 7/1941 | Smith et al. ................... 220/252 |
| 2,740,395 | A | * | 4/1956 | Goodwin ..................... 126/25 A |
| 4,026,266 | A | * | 5/1977 | Cremer ....................... 126/25 A |
| 4,340,027 | A | * | 7/1982 | Fuss ............................ 126/25 R |
| 4,463,746 | A | * | 8/1984 | Knuth et al. ................ 126/25 R |
| 4,895,130 | A | * | 1/1990 | Staschke ..................... 126/25 R |
| 5,070,777 | A | * | 12/1991 | Novak .......................... 99/482 |
| 5,615,666 | A | * | 4/1997 | Ransom ..................... 126/25 R |
| 6,000,739 | A | * | 12/1999 | Zemit et al. ....................... 294/9 |
| 6,065,464 | A | * | 5/2000 | Zajec .......................... 126/25 R |
| 7,383,835 | B2 | * | 6/2008 | Liu .............................. 126/25 R |
| 7,832,330 | B1 | * | 11/2010 | Thompson ..................... 99/481 |

OTHER PUBLICATIONS

"Smokenator 1000"; http://www.smokenator.com/home.aspx; retrieved Jul. 30, 2013; 1 page.
"The Smokenator—What It Does?"; http://www.smokenator.com/what-it-does.aspx; retrieved Jul. 30, 2013; 2 pages.
"The Smokenator—Introduction"; http://www.smokenator.com/how-it-works.aspx; retrieved Jul. 30, 2013; 5 pages.

(Continued)

*Primary Examiner* — Reginald L Alexander
(74) *Attorney, Agent, or Firm* — Ulmer & Berne LLP

(57) ABSTRACT

Described are embodiments of a grilling apparatus and associated methods that can include a bottom portion defining a cavity and a firewall. The firewall can be positioned within the cavity defined by the bottom portion such that the cavity can be divided into a first section and a second section, where the first section can retain a heating element. A grate assembly that can include a grate and a handle can be positioned within the bottom portion and can be configured to rotate relative to the bottom portion. The grilling apparatus can include a lid that can be configured to cover at least a portion of the grate assembly.

20 Claims, 17 Drawing Sheets

(56) References Cited

OTHER PUBLICATIONS

"Smokers for the Home User"; http://www.smokenator.com/competetive-advantages.aspx; retrieved Jul. 30, 2013; 4 pages.
"The Smokenator—Benefits"; http://www.smokenator.com/benefits.aspx; retrieved Jul. 30, 2013; 1 page.
"Smokenator Reviews!"; http://www.smokenator.com/reviews.aspx; retrieved Jul. 30, 2013; 6 pages.
"Setting Up the Smokenator"; http://www.smokenator.com/instructions.aspx; retrieved Jul. 30, 2013; 1 page.
"FAQS"; http://www.smokenator.com/faqs.aspx; retrieved Jul. 30, 2013; 2 pages.
"The Smokenator Forum"; http://smokenatorforum.proboards.com/; retrieved Jul. 30, 2013; 3 pages.
"Contact Us"; http://www.smokenator.com/contact.aspx; retrieved Jul. 30, 2013; 2 pages.
"The Smokenator Store—The Smokenator . . ."; http://www.smokenator.com/store; retrieved Jul. 30, 2013; 2 pages.
"The Smokenator Store—New products"; http://www.smokenator.com/Store/newproducts; retrieved Jul. 30, 2013; 2 pages.

* cited by examiner

DETAIL A

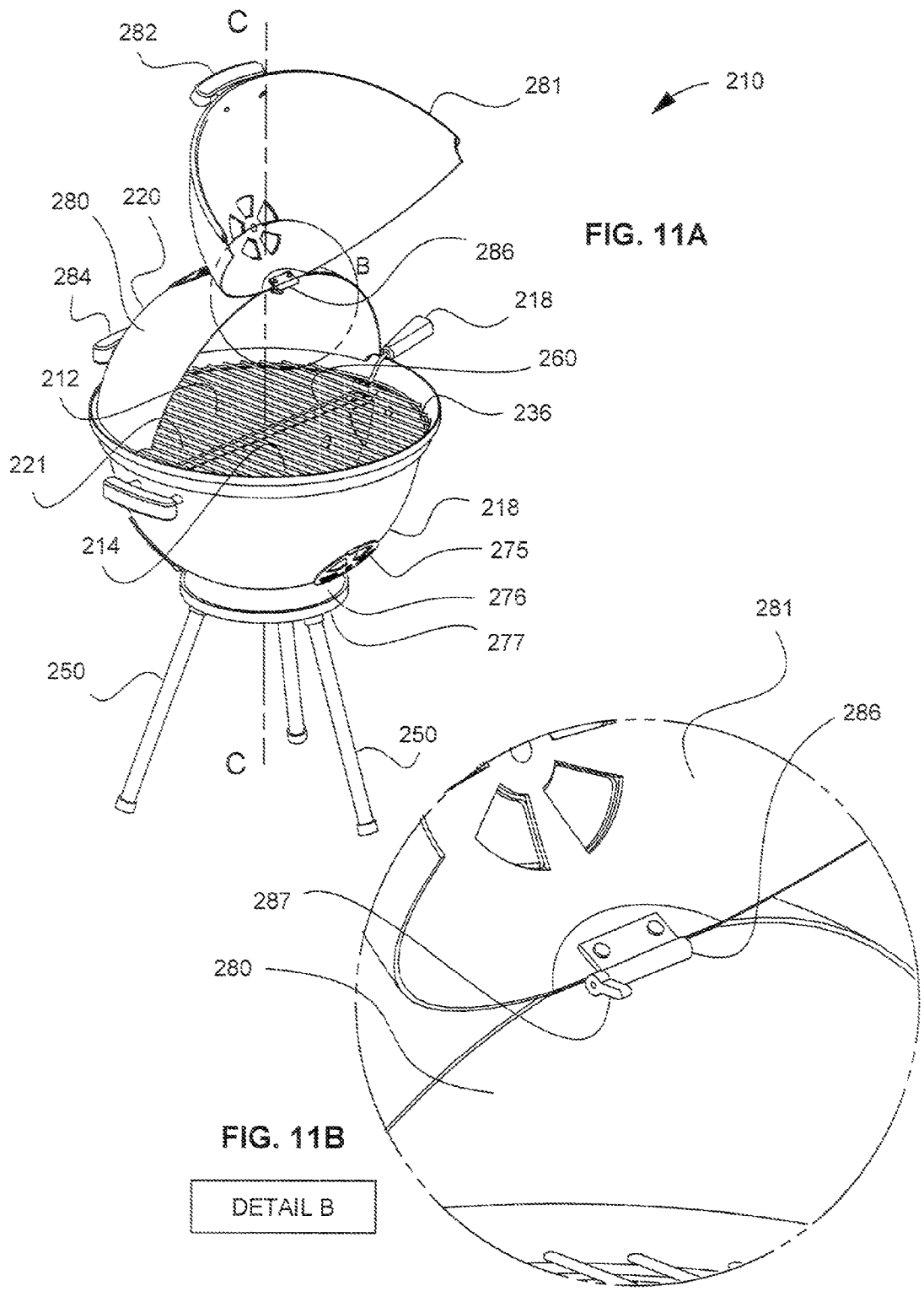

CHARCOAL GRILLING APPARATUS AND METHODS

REFERENCE TO RELATED APPLICATION

The present application claims the priority benefit of U.S. provisional patent application Ser. No. 61/677,247, filed Jul. 30, 2012, and hereby incorporates the same application herein by reference in its entirety.

FIELD OF THE INVENTION

The present invention relates generally to a grilling apparatus and, more particularly, to a charcoal grilling apparatus that can include a firewall and a rotating grate assembly.

BACKGROUND OF THE INVENTION

Grilling meats and other foods is becoming increasingly popular and is associated with a wide range of activities, such as family meals, barbecues, picnics and tailgating activities. Although there are a number of different types of grills, including charcoal grills, these grills can suffer from a number of limitations. Charcoal grills generally have a lower body portion in which charcoal is arranged to cook food on a grate or rack above charcoal briquettes. Such grills also generally come with a solid dome-shaped lid that completely covers the cooking surface of the grill during operation. Although such grills are still popular, users may experience a number of difficulties with existing grill systems including difficulty in visualizing food being cooked, difficulty in uniformly cooking food, flare-ups, and cumbersome lids.

BRIEF DESCRIPTION OF THE DRAWINGS

The accompanying drawings, incorporated in and forming a part of the specification, illustrate several aspects of the present disclosure, and together with the description serve to explain the principles of the invention. In the drawings:

FIG. 11A is a perspective view of an alternate embodiment of a grilling apparatus that can include a hinged lid having a first lid portion and a second lid portion that can be coupled with a hinge, where the grilling apparatus is shown in an open position and a region B is identified;

FIG. 11B is a more detailed view of region B, depicted in FIG. 11A, showing the hinge of the grilling apparatus in the open position;

DETAILED DESCRIPTION OF THE INVENTION

Figure 1:
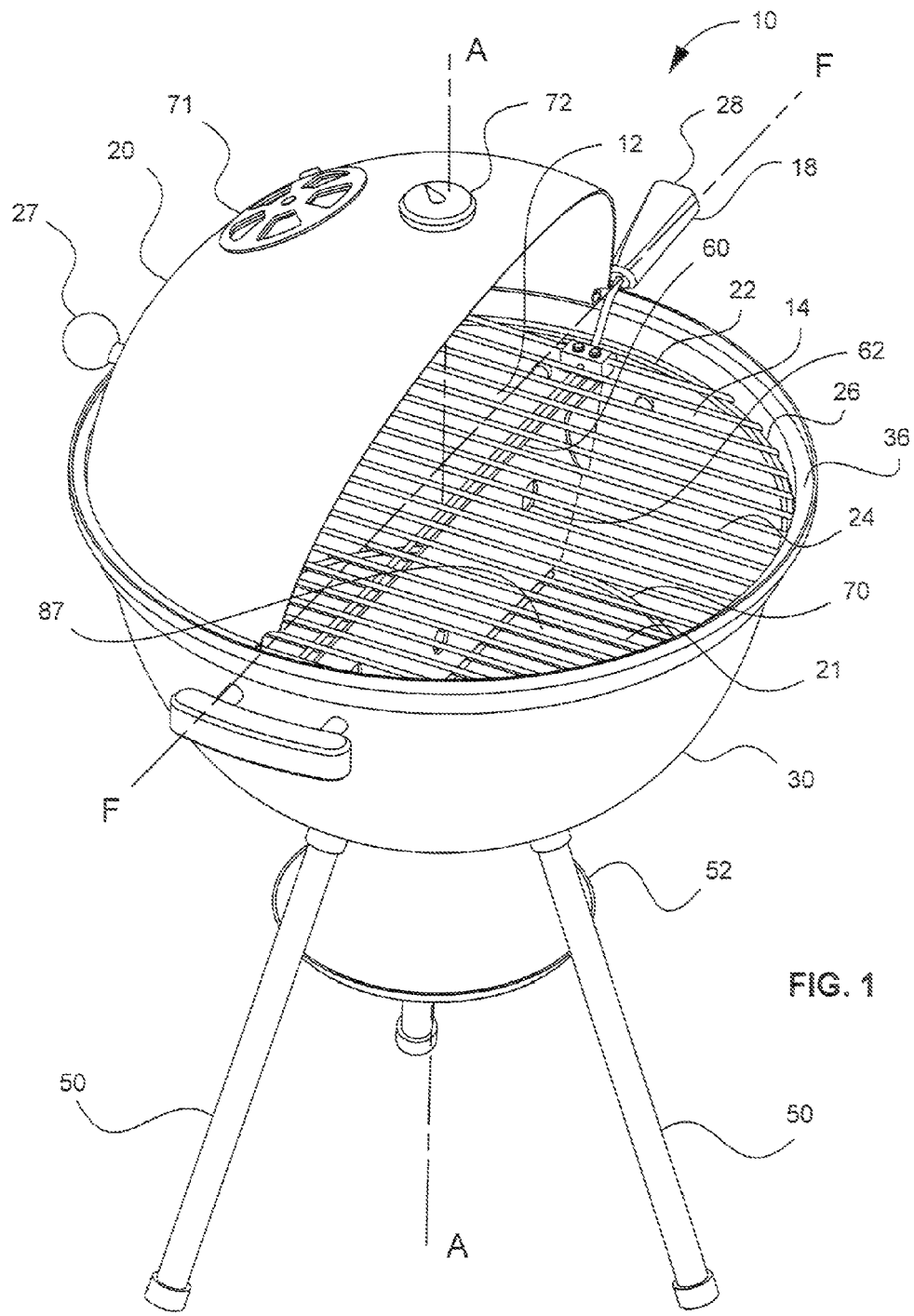
FIG. 1 is a perspective view of a grilling apparatus according to one embodiment shown with a hemispherical lid, a rotatable grate assembly, and a lower portion divided into a first section and a second section by a firewall.
Figure 2:
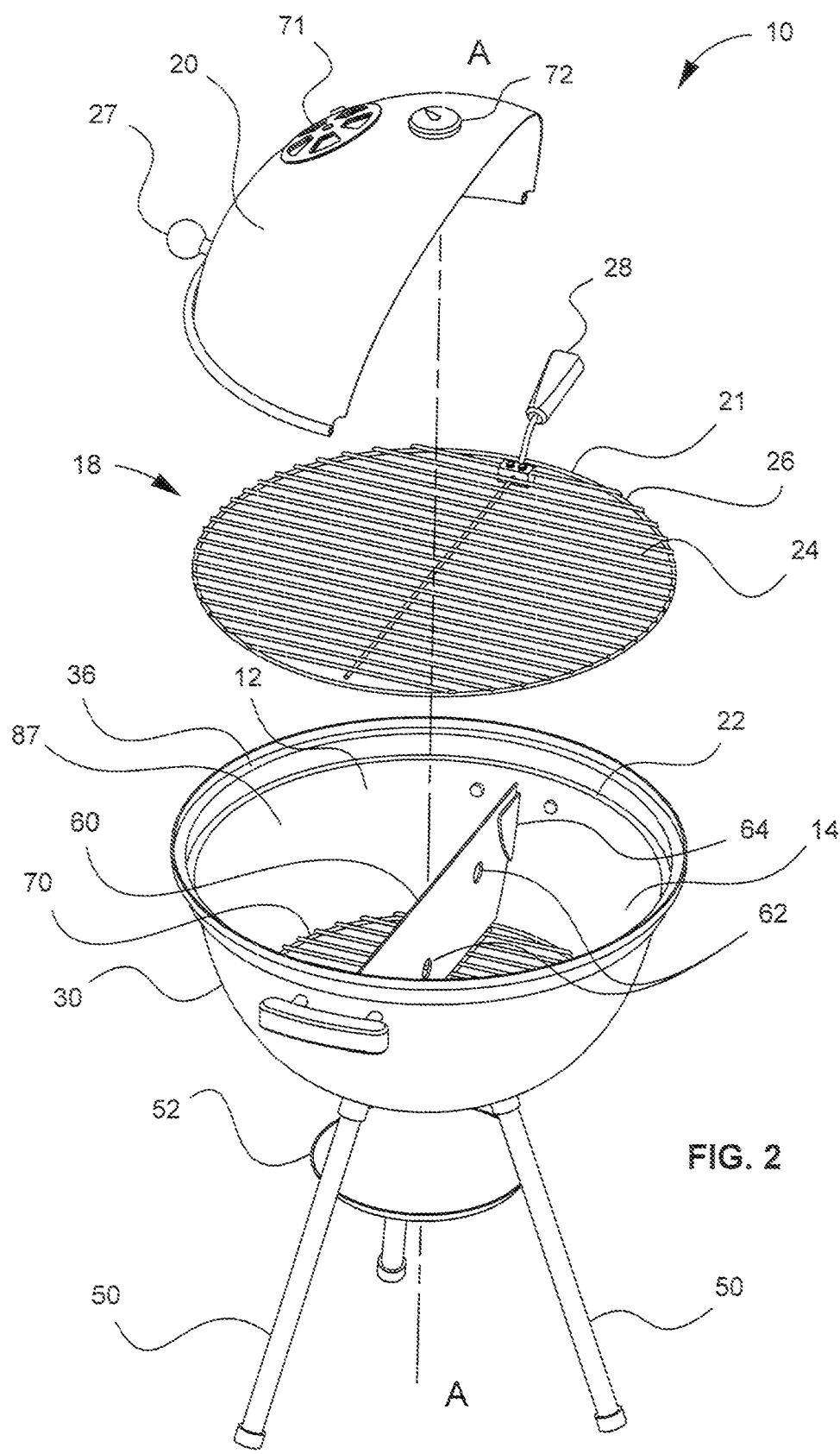
FIG. 2 is an exploded view of the grilling apparatus depicted in FIG. 1.

Various non-limiting embodiments of the present disclosure will now be described to provide an overall understanding of the principles of the structure, function, and use of the grilling apparatuses, systems, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Described herein are example embodiments of a grilling apparatus. In one example embodiment, a grilling apparatus can include a rotatable grate assembly and a firewall that can separate a cooking region from a non-cooking region. In some embodiments, the grilling apparatus can include a hinged, rotatable, pivotable, or movable lid. In some embodiments, the grilling apparatus can include a shield that can prevent flare-ups.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example embodiments of a grilling apparatus can provide for more consistent and predictable grilling. Example embodiments of a grilling apparatus can allow a user to rotate food from a cooking portion to a non-cooking portion of a grill while at the same time allowing the user to visualize the food being grilled. Additionally, or alternatively, example embodiments can include features such as movable lids, a firewall, a rotatable grate assembly, a shield to prevent flare-ups, and other components or elements that can improve grilling quality.

Referring now to FIGS. 1-7, a grilling apparatus 10 is shown according to an example embodiment. The grilling apparatus 10 can include a lid 20 that can be associated with a bottom portion 30. The bottom portion 30 can be hemispherical or can have any other suitable shape or configuration and can define a cavity 87. The lid 20 can be a partial hemisphere and can be fixed, removable, or rotatable (FIG. 7) relative to the bottom portion 30. The bottom portion 30 can be associated with a plurality of legs 50 that can form a tripod support or arrangement for the grilling apparatus 10. The plurality of legs 50 can be coupled with a pan 52 that can be used for collecting grease from the bottom portion 30 during use of the grilling apparatus 10. It will be appreciated that any suitable support, including the plurality of legs 50, is contemplated. The bottom portion 30 can include a circumferential channel 36 in which the lid 20 can be seated. When coupled together, the lid 20 and the bottom portion 30 can be configured to form a sphere or egg-shaped structure.

Figure 6:
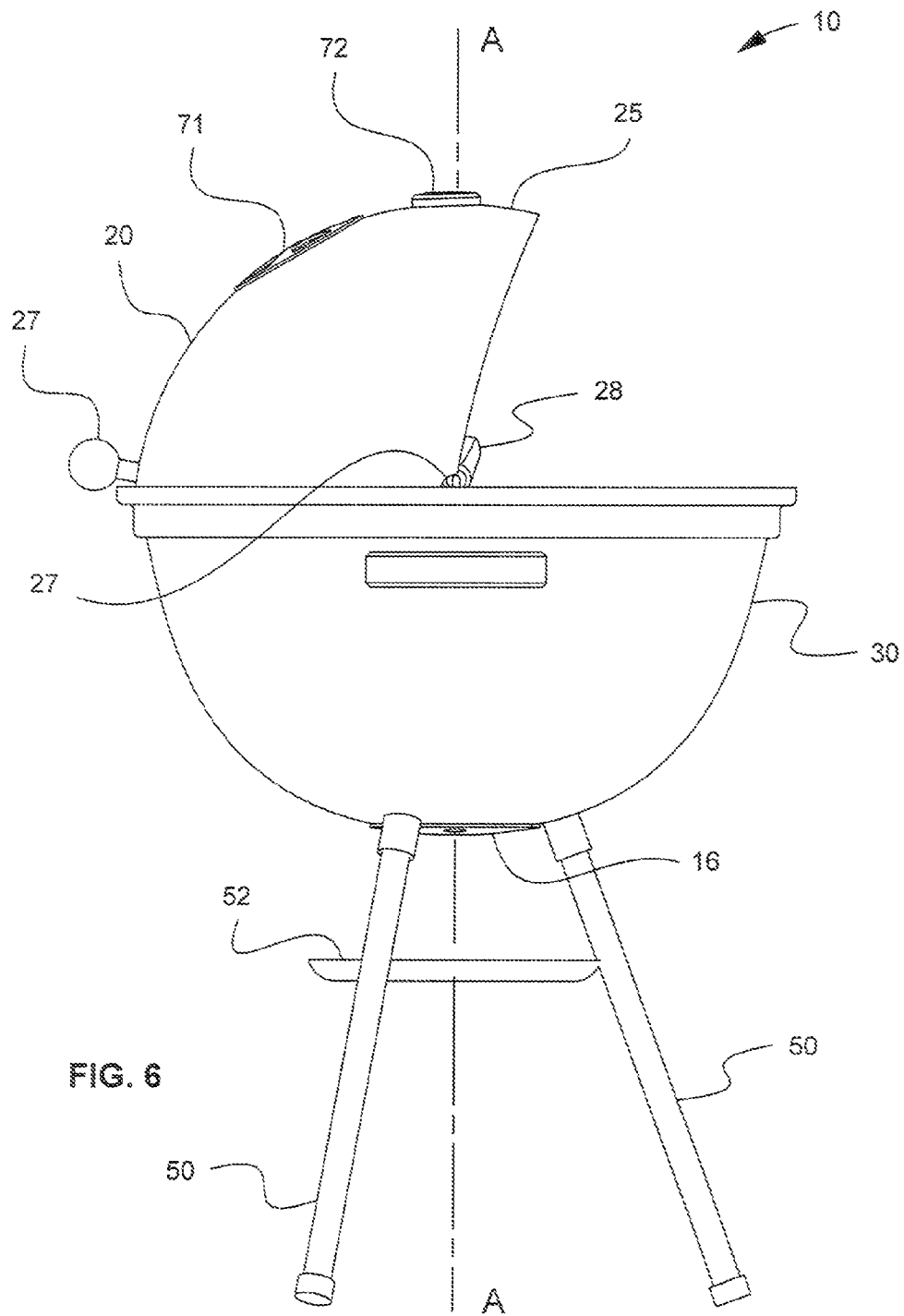
FIG. 6 is a side view of the grilling apparatus depicted in FIG. 1.
Figure 7:
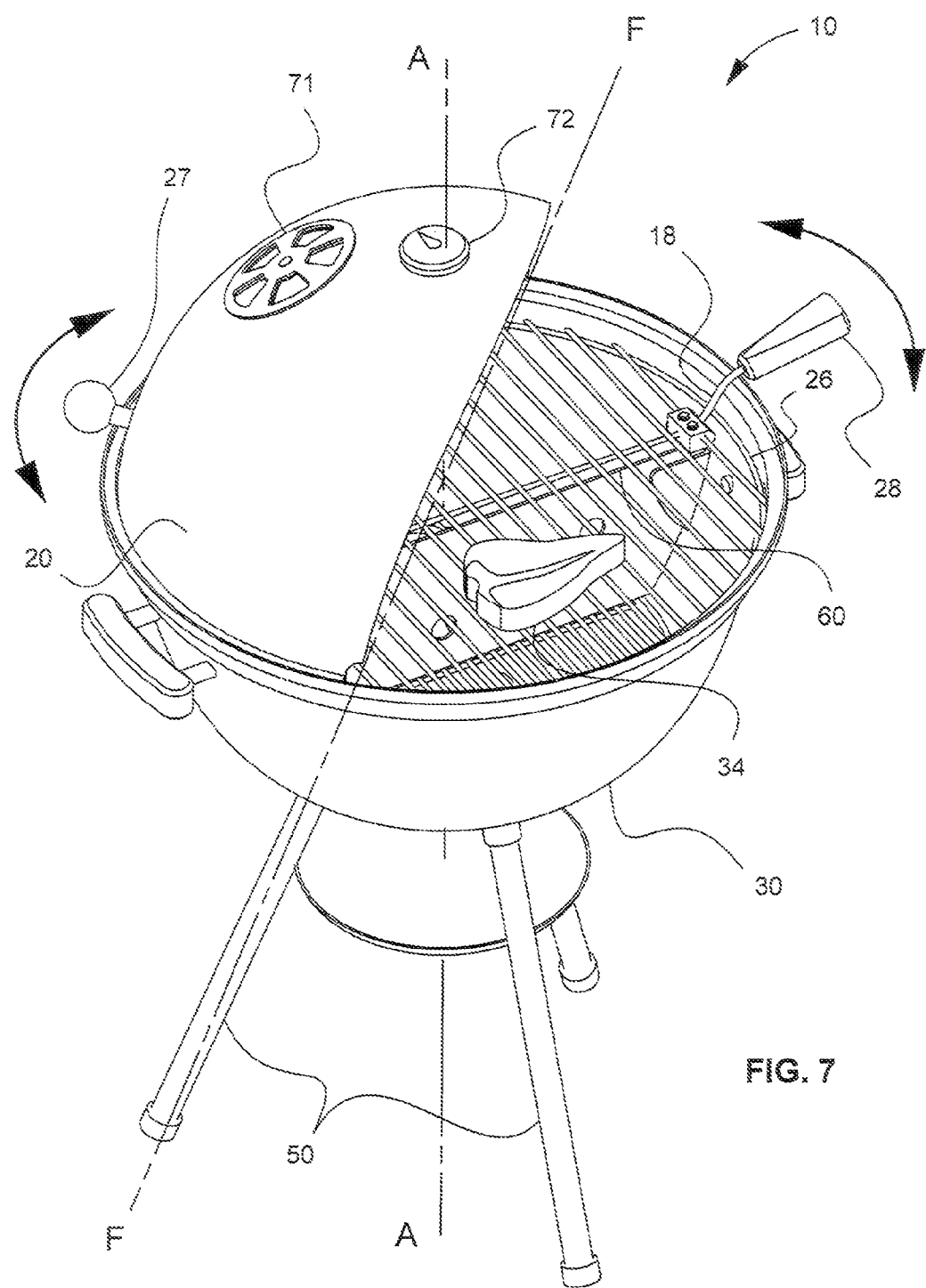
FIG. 7 is a perspective view of the grilling apparatus depicting FIG. 1, showing pivotal movement of the hemispherical lid about an axis F-F and axis A-A and rotational movement of the grate assembly about an axis A-A.

Referring to FIG. 6, the lid 20 can be a partial hemisphere and can include a lip or overhang 25. A partial hemisphere configuration may improve visualization for the user and can allow potentially beneficial exterior air to enter the grilling apparatus 10. Such a configuration may eliminate the need for a user to repeatedly open and close the grilling apparatus 10, which can cause heat loss and unpredictable grilling. The lid 20 can define a pair of notches 27 that can accommodate the handle 28 when the grate assembly 18 is rotated from a first position to a second position as discussed in more detail herein. The lid 20 can include any suitable features or accessories such as a vent 71, a thermometer 72, internal hooks, skewers, or racks for food (not shown), or the like. Lid 20 can be oriented or movable relative to firewall 60 and can be used to control cooking temperature where, for example, food substantially covered by the lid 20 may be exposed to a higher temperature than food only partially covered or not covered by the lid 20. More specifically, lid 20 can include a handle 27 that can be used to articulate or pivot the lid 20 about an axis A-A or axis F-F as illustrated in FIG. 7.

Referring to FIGS. 1-7, the grilling apparatus 10 can include a firewall 60 that can be positioned in the cavity 87 that can be defined by the bottom portion 30, where the firewall 60 can divide the bottom portion 30 into a first section 12 and a second section 14. In an example embodiment, the firewall 60 can divide the bottom portion 30 such that the first section 12 and second section 14 are equal halves. However, any suitable configuration is contemplated including a firewall that can divide the bottom portion into any number of sections of any suitable size. For example, the bottom portion can be divided into three sections, four sections, five sections, or six sections where, for example, the firewall can have a plurality of fins or dividers such that the bottom portion is suitably divided. The firewall 60 can be substantially semi-circular and can be retained within the bottom portion 30 in a vertical orientation. The firewall 60 can define a plurality of apertures 62, where each of the plurality of apertures 62 can have pre-set diameters (e.g., 0.25 inches) such that air can flow between the first section 12 and the second section 14. Apertures can range from about 0.25 inches to about 1.5 inches in diameter, from about 0.75 inches to about 1.5 inches in diameter, or from about 0.5 to about 2 inches in diameter. It will be appreciated that any suitable number or configuration of apertures 62 is contemplated, including embodiments without apertures. In an example embodiment, the plurality of apertures 62 can be adjustable and/or selectively closed and opened by adjusting an aperture closure (not shown). In an example embodiment, the firewall 60 can be selectively removable from one or a plurality of brackets 64 that can be integral with the bottom portion 30.

The grilling apparatus 10 can include a charcoal grid 70 (FIG. 5) that can be positioned horizontally within the bottom portion 30 beneath the firewall 60. The charcoal grid 70 can be semi-circular in shape such that the charcoal grid 70 can be positioned only in the first section 12, for example, or alternatively the charcoal grid 70 can be circular and can substantially cover the bottom portion 30. In an example embodiment, the charcoal grid 70 can be semi-circular (not shown) and can be removable and interchangeable such that it can be positioned in either the first section 12 or the second section 14. In an example embodiment, the charcoal grid 70 can hold charcoal above and away from the bottom of the grilling apparatus 10 such that the charcoal can be vented in combination with one or a plurality of vent holes 16 (FIGS. 5 and 6) that can be defined by the bottom portion 30.

The grilling apparatus 10 can include a grate assembly 18 that can be seated on a circumferential lip 22 on the bottom portion 30. The grate assembly 18, which can be selectively removable from the bottom portion 30, can include a grate 21 that can include a plurality of rods 24 that can be welded or otherwise coupled with an outer perimeter 26 such that a suitable cooking surface is formed. The grate assembly 18 can include a handle 28 that can be fixedly or removably coupled with the grate 21. The handle 28 can project radially outward from the bottom portion 30 when the grate 21 is positioned on the lip 22 such that a user can grasp the handle 28 without getting burned. In an example embodiment, as discussed in more detail herein, the grate assembly 18 can be rotated relative to a central axis A-A such that food positioned on the grate 21 can be selectively moved to different locations on the grilling apparatus 10. In an alternate embodiment, the circumferential lip 22 can be configured to swivel or rotate relative to the bottom portion 30 and the grate 21 can rotate concomitantly with the circumferential lip 22 such that a user can adjust the position of food 34 without the need for a handle 28. In an alternate embodiment, the handle 28 can be removable, foldable, or telescoping. In an alternate embodiment, a grilling apparatus can include a motor (not shown), a timer (not shown), and a programmable controller (not shown), where timed rotation of the grate 21 can be programmed or pre-programmed. In an alternate embodiment, the grate or firewall can be bifurcated or otherwise divided into different materials having different conductive or heat transfer coefficients.

Figure 3:
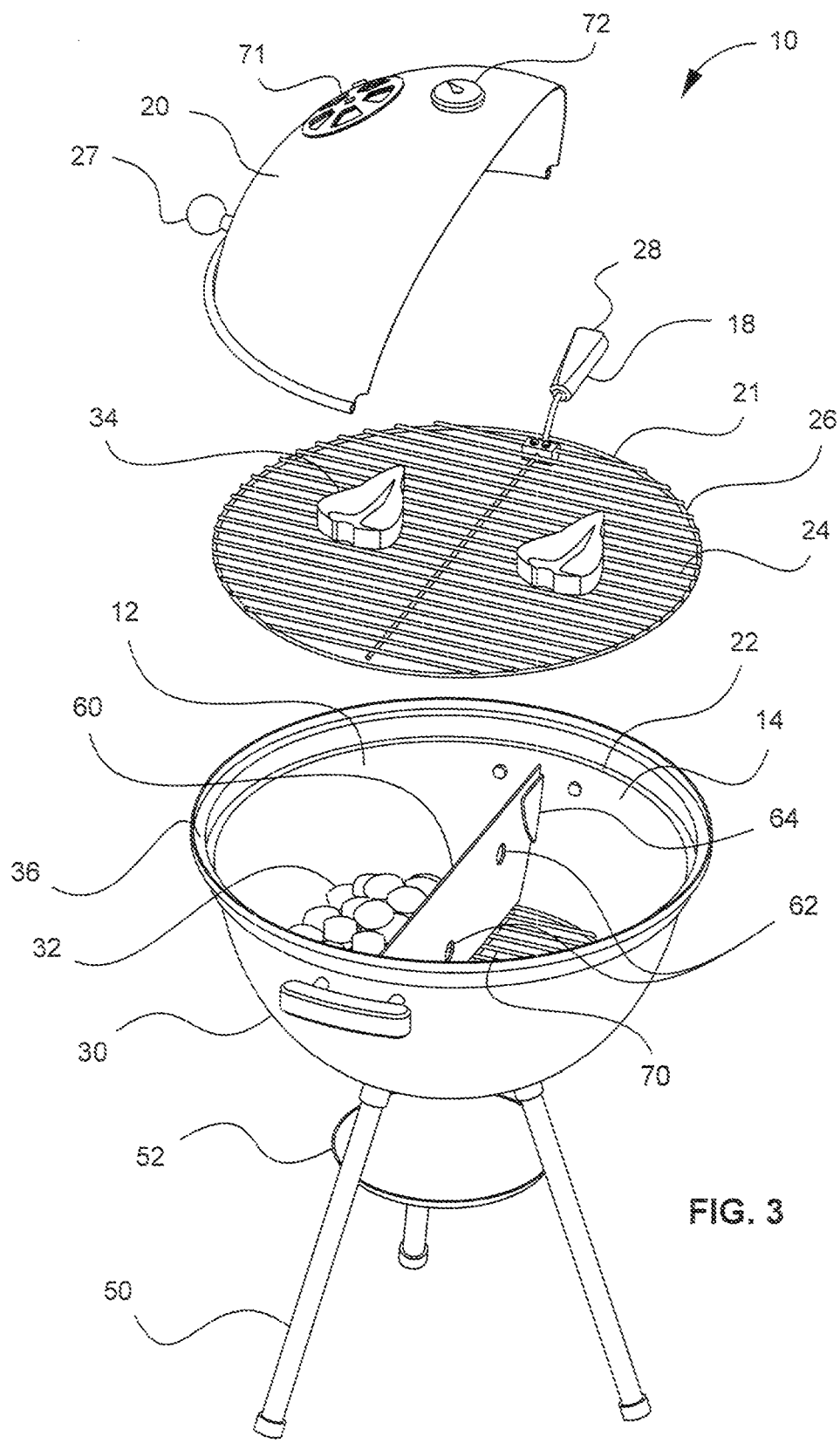
FIG. 3 is an exploded view of the grilling apparatus depicted in FIG. 1, shown with food positioned on the grate assembly and a heating element placed in the first section of the lower portion.
Figure 4:
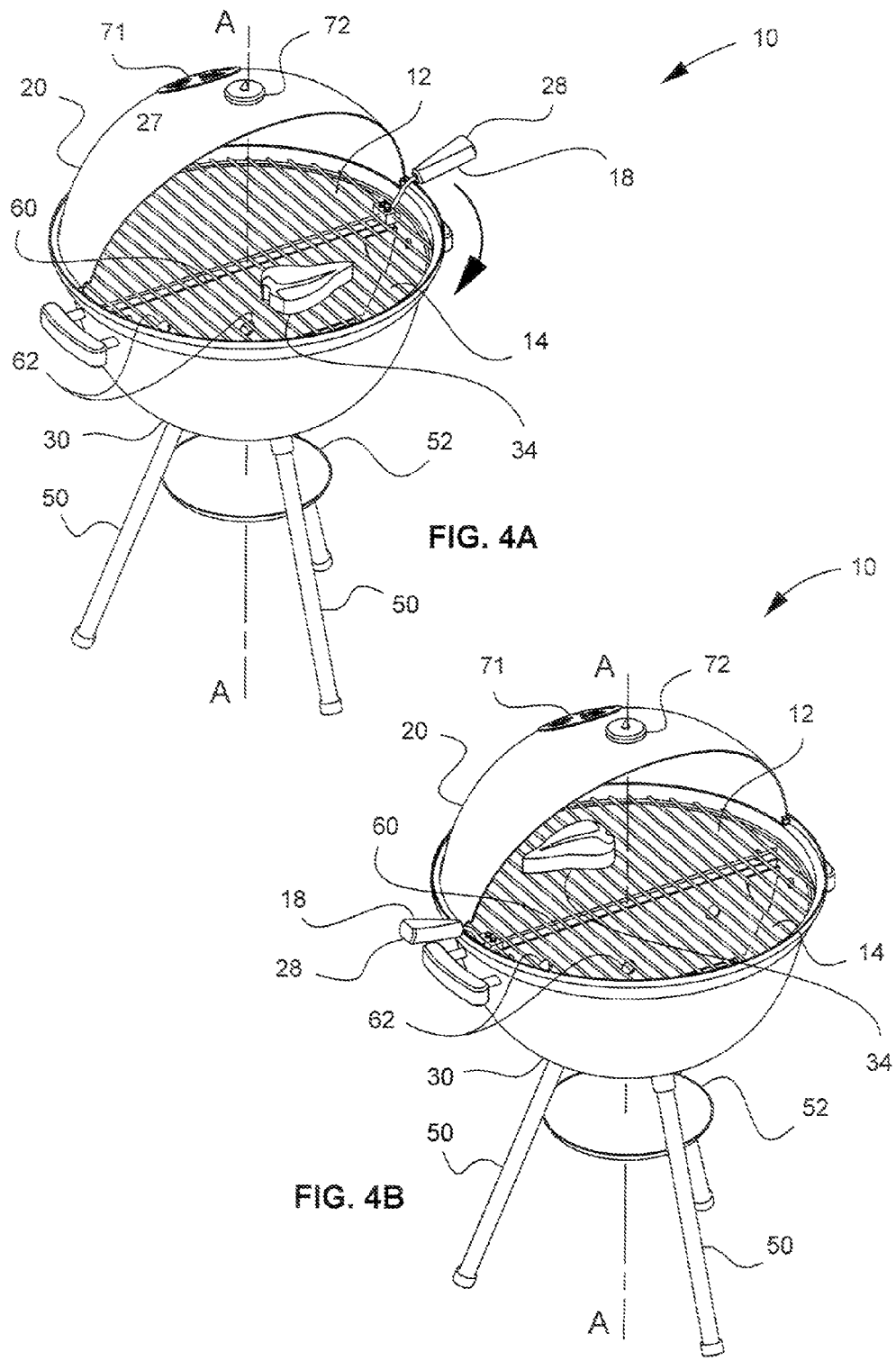
FIG. 4A is a perspective view of the grilling apparatus depicted in FIG. 1, shown with food in a first position over the second section of the lower portion.
FIG. 4B is a perspective view of the grilling apparatus depicted in FIG. 1, shown with food moved to a second position over the first section of the lower portion after the grate assembly has been rotated.
Figure 5:
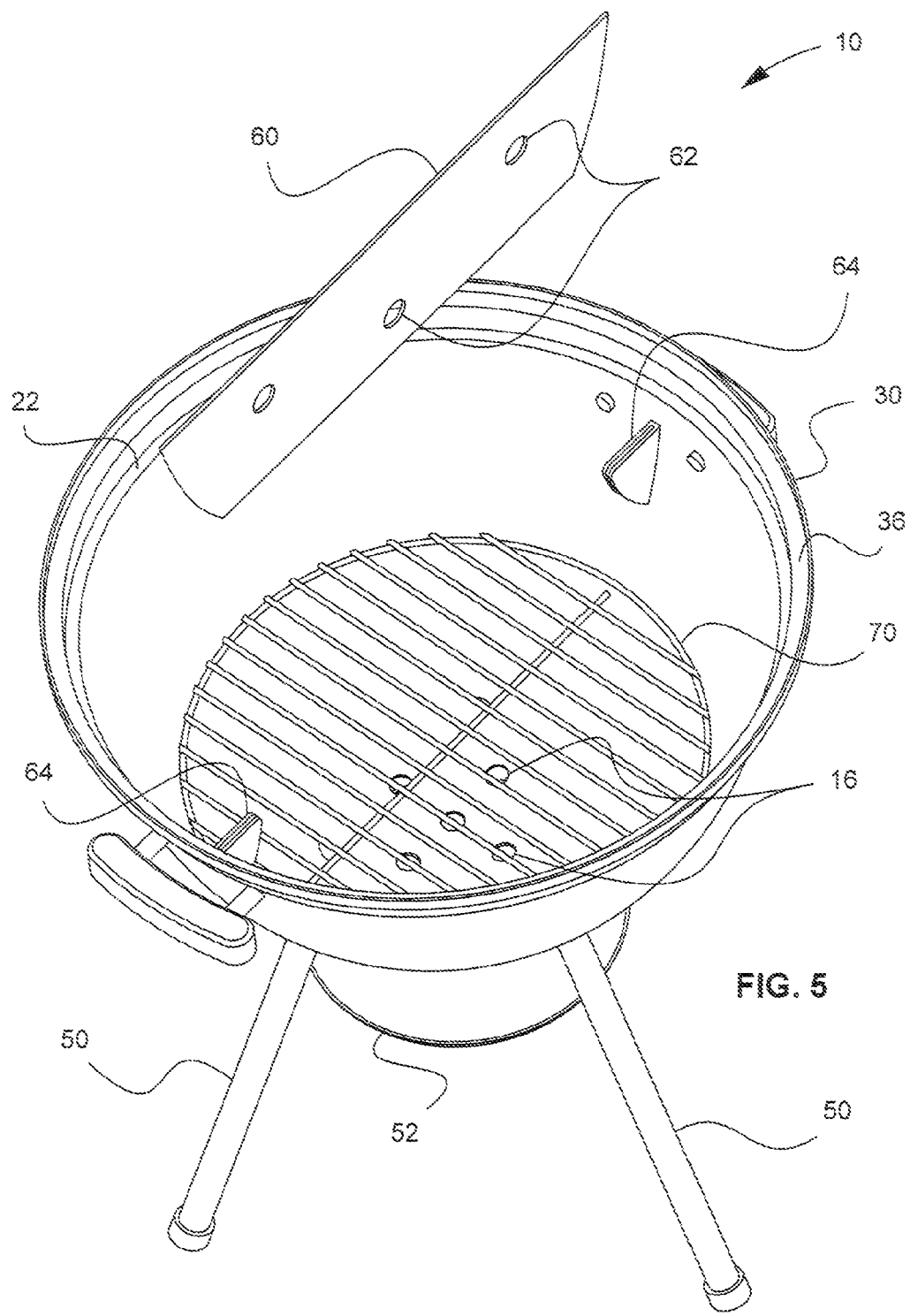
FIG. 5 is a partial exploded view of the grilling apparatus depicted in FIG. 1, shown with the firewall removed from the lower portion.

Still referring to FIGS. 1-7, the circumferential lip 22 can retain the grate assembly 18 such that the grate 21 can be rotated about the central axis A-A during use of the grilling apparatus 10. Referring to FIG. 3, a heating element 32, such as charcoal, can be provided in the first section 12 of the bottom portion 30 such that food 34 positioned on the grate 21 above the first section 12 can be cooked. The second section 14 can remain substantially empty such that food 34 positioned on the grate 21 above the second section 14 is not cooked or is exposed to a lower temperature than the first section. The firewall 60 can substantially limit or prevent heat transfer from the heating element 32 in the first section 12 into the second section 14. In an example embodiment, providing a first section 12 that can actively cook food and a second section 14 that does not actively cook food may allow a user to more consistently grill food to a desired temperature by adjusting the position of the food 34 over the desired section. In an example embodiment, food 34 can initially be positioned above the first section 12, containing the heating element 32. The lid 20 can cover the first section 12, where such a configuration may allow food 34 to be cooked under the lid 20 to retain heat while still being visible to a user. Such a configuration may, for example, obviate the need to repeatedly remove a grill lid to evaluate the progress of food being cooked.

Referring to FIGS. 4A and 4B, the grilling apparatus 10 can include a grate assembly 18 that can be rotated from a first position to a second position. The grate assembly 18 can be moved from the first position to the second position by rotating the grate assembly substantially 180 degrees about a central axis A-A with the handle 28. In an example embodiment, food 34 can be positioned over a cool second section 14 (FIG. 4A) in the first position and can be positioned over a hot first section 12 in the second position (FIG. 4B). A user can rotate the grate assembly 18 between the first position and the second position until the food 34 is appropriately grilled. It will be appreciated that any suitable range of rotation or motion of the grate assembly 18 is contemplated, including a range greater or less than 180 degrees. It will be appreciated that a hot first section 12 and a cool second section 14 are described by way of example only, where the first section 12 and second section 14 can be reversed, can both contain heating elements, can contain different heating elements, can contain cooling elements, can contain smoking elements, or can include any other substance or material suitable for cooking or grilling. The plurality of apertures 62 can be used to vent the heating element 32 and can also allow the heating element 32 to be lighted or ignited without endangering the user.

Figure 8A:
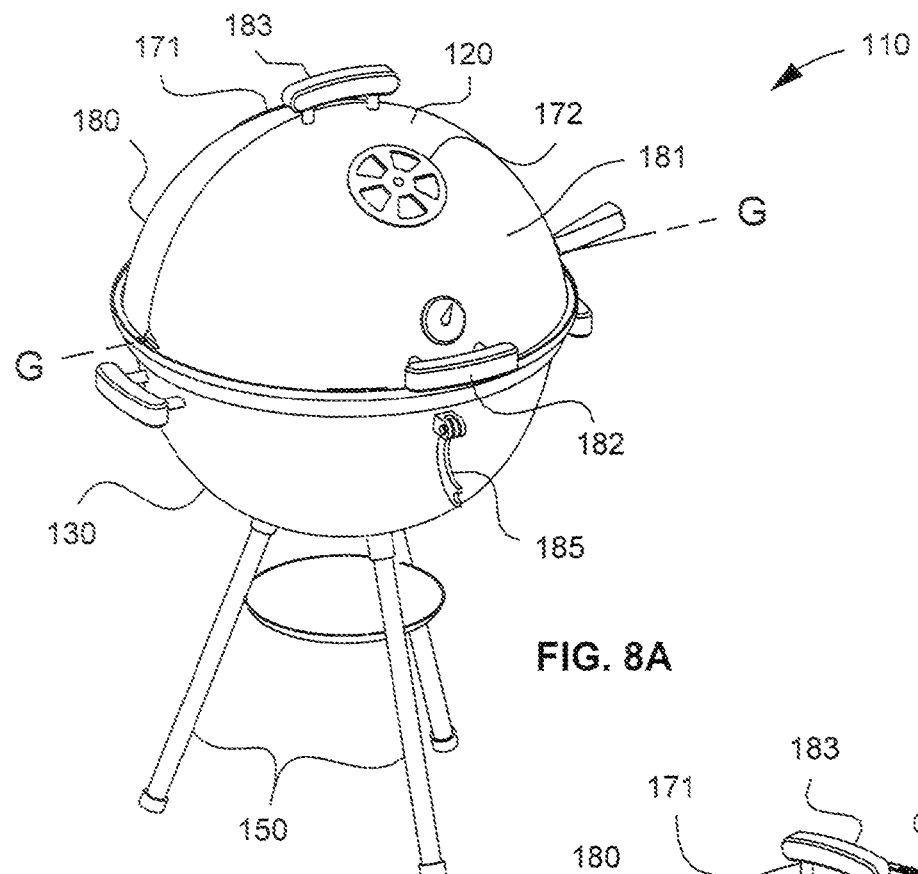
FIG. 8A is a front perspective view of a grilling apparatus according to an alternate embodiment, where the grilling apparatus can include a movable lid, shown in a closed position, that can have a first lid portion and a second lid portion.
Figure 8B:
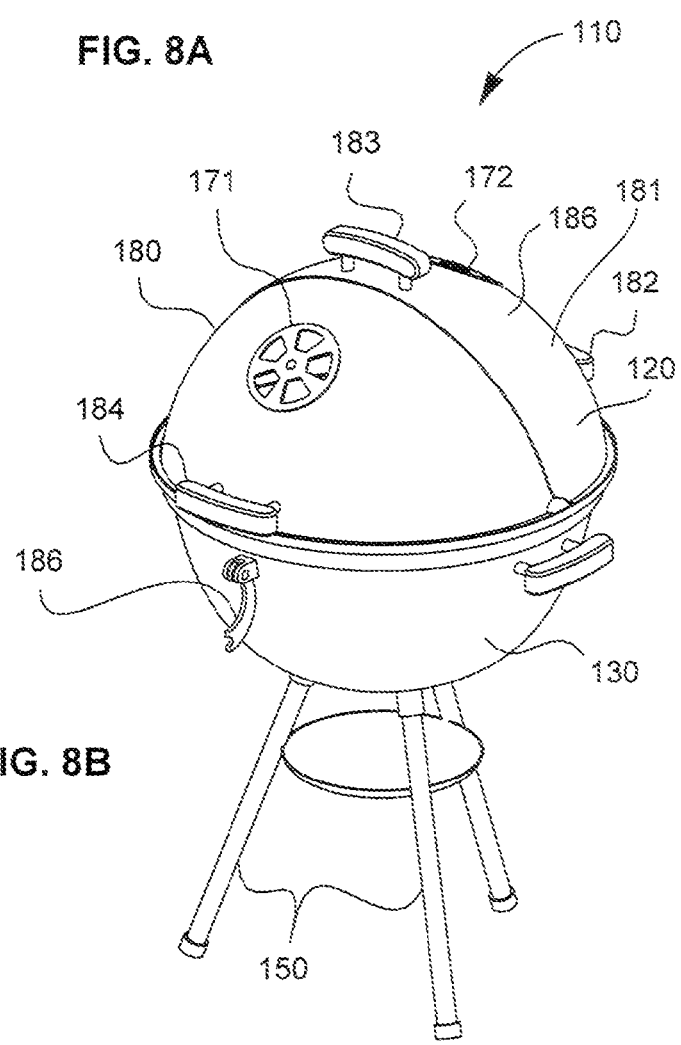
FIG. 8B is a rear perspective view of the grilling apparatus depicted in FIG. 8A, shown in the closed position.
Figure 9:
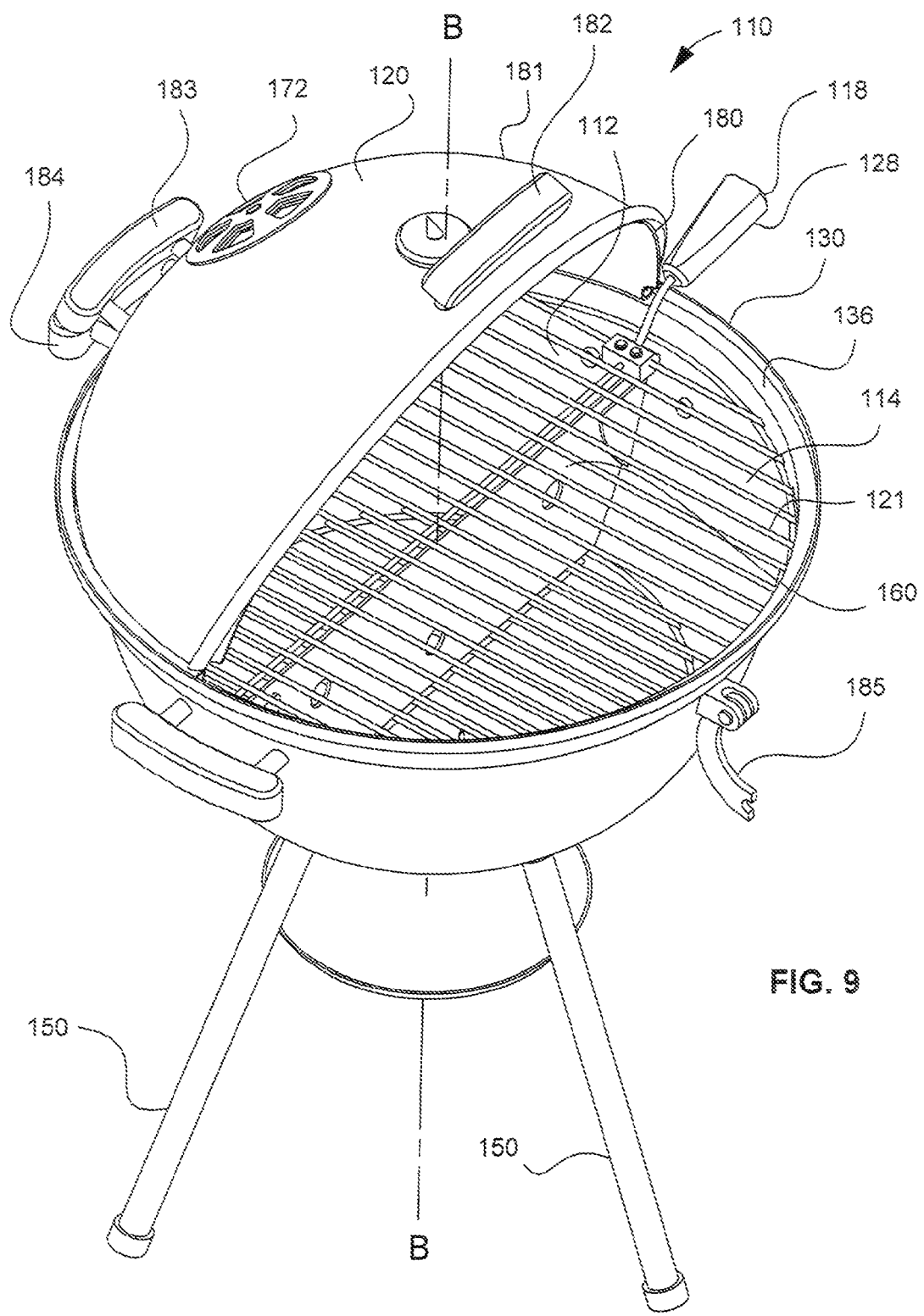
FIG. 9 is a perspective view of the grilling apparatus depicted in FIG. 8A, shown in an open position with the first lid portion nested within the second lid portion.

Referring to FIGS. 8A-10B, an alternate embodiment of a grilling apparatus 110 is depicted. With reference to FIG. 9, the grilling apparatus 110 can include a lid 120 that can be associated with a bottom portion 130, a plurality of legs 150, a grate assembly 118, and a firewall 160. Referring to FIGS. 8A and 8B, the lid 120 can include a first lid portion 180 and a second lid portion 181, where the second lid portion 181 can be configured to pivot about an axis G-G, such that the lid 120 can be opened and closed. In the closed position, which is illustrated in FIGS. 8A and 8B, the lid 120 can substantially cover a grate 121 (FIG. 9) of the grate assembly 118. Referring to FIG. 9, when the lid 120 is in an open position, the second lid portion 181 can pivot about the axis G-G such that the first lid portion 180 can be nested within the second lid portion 181. When the lid 120 is in the open position, the grate 121 can be at least partially exposed to allow the user to access or visualize food being cooked. The bottom portion 130 can include a circumferential channel 136 in which the lid 120 can be seated. Providing a lid 120 that can be selective opened and closed can allow a user to visualize food being cooked without unnecessarily losing heat trapped, for example, by the first lid portion 180. Such a configuration may be preferable to a lid that must be completely removed to access or view food being grilled.

The first lid portion 180 and the second lid portion 181 can be separate components or, in an alternative embodiment, can be coupled at about the axis G-G such that the first lid portion 180 and the second lid portion 181 can pivot or otherwise move relative to one another. The second lid portion 181 can include a first lid handle 182 and a second lid handle 183 that can be used to pivot the second lid portion 181 relative to the first lid portion 180. In an example embodiment, the first lid portion 180 can include a third handle 184 that can be used to pivot the first lid portion relative to the second lid portion 181. In the illustrated embodiment, either half of the grilling apparatus 110 can be exposed by the user, which may be beneficial in the grilling process. For example, if a user desires a first section 112 to remain covered at all times, the user can open the lid 120 by pivoting the second lid portion 181 relative to the first lid portion 180. If the user wishes to access the first section 112, the first lid portion 180 can be pivoted relative to the second lid portion 181. It will be appreciated, in an alternative embodiment, that the first lid portion 180 or the second lid portion 181 can be fixedly coupled to the bottom portion 130 such that only one portion of the lid 120 can be configured for movement. In the open position, the first lid handle 182 can also be used to remove the lid 120 from the bottom portion 130.

Referring to FIG. 9, the grate assembly 118 can be configured to rotate about an axis B-B, for example, by rotating a handle 128 in accordance with embodiments described herein. In an example embodiment, the grate assembly 118 can be configured to rotate about the axis B-B when the lid 120 is in at least a partially open position, where food can be moved to different positions on the grilling apparatus 110. Alternatively, the second lid portion 181, for example, can include a cutout (not shown) such that when the lid 120 is in the closed position the handle 128 can have freedom of movement to rotate 180 degrees relative to the axis B-B.

The lid 120 can include any suitable components or features such as a first vent 171 that can be associated with the first lid portion 180 and a second vent 172 that can be associated with the second lid portion 181. The lid 120 can include any suitable arrangement or number of vents, racks, thermometers, skewers, hooks, handles, spacers, or the like. Including a plurality of vents can provide a user with even more control over the internal atmosphere or grilling conditions of the grilling apparatus. In an example embodiment, the first vent 171 and the second vent 172 can be positioned on the lid 120 such that when the lid is in an open position (FIG. 9) the first vent 171 and the second vent 172 can be aligned to allow venting.

Figure 10A:
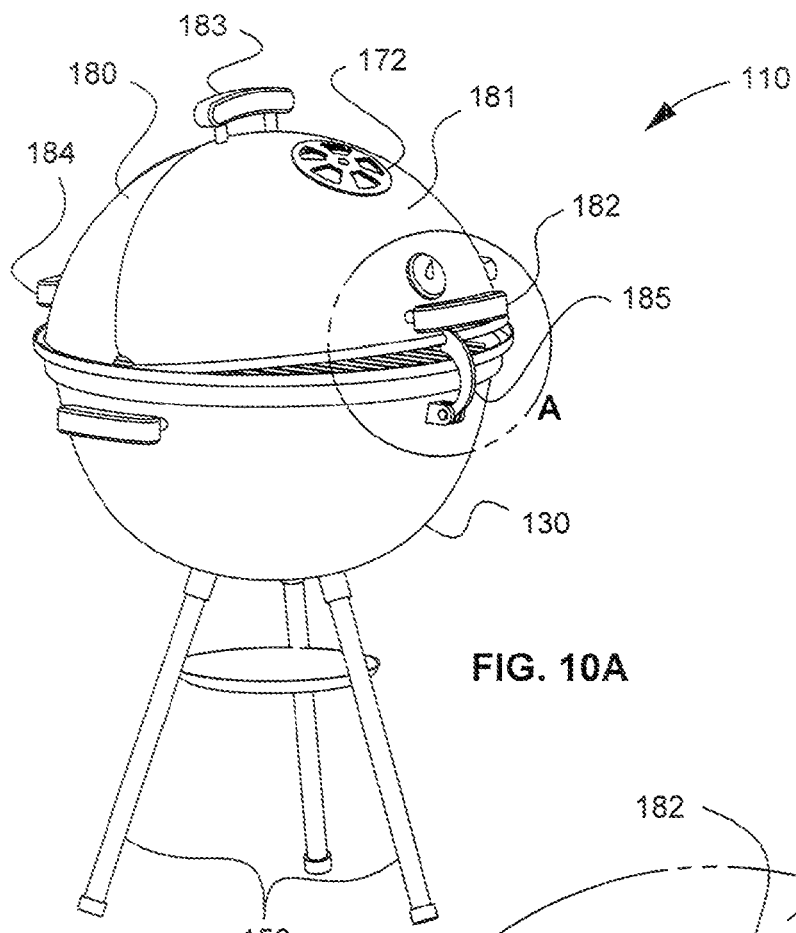
FIG. 10A is a perspective view of the grilling apparatus depicted in FIG. 8A, further identifying a region A, and shown with a spacer engaged to retain the movable lid in a partially open position.
Figure 10B:
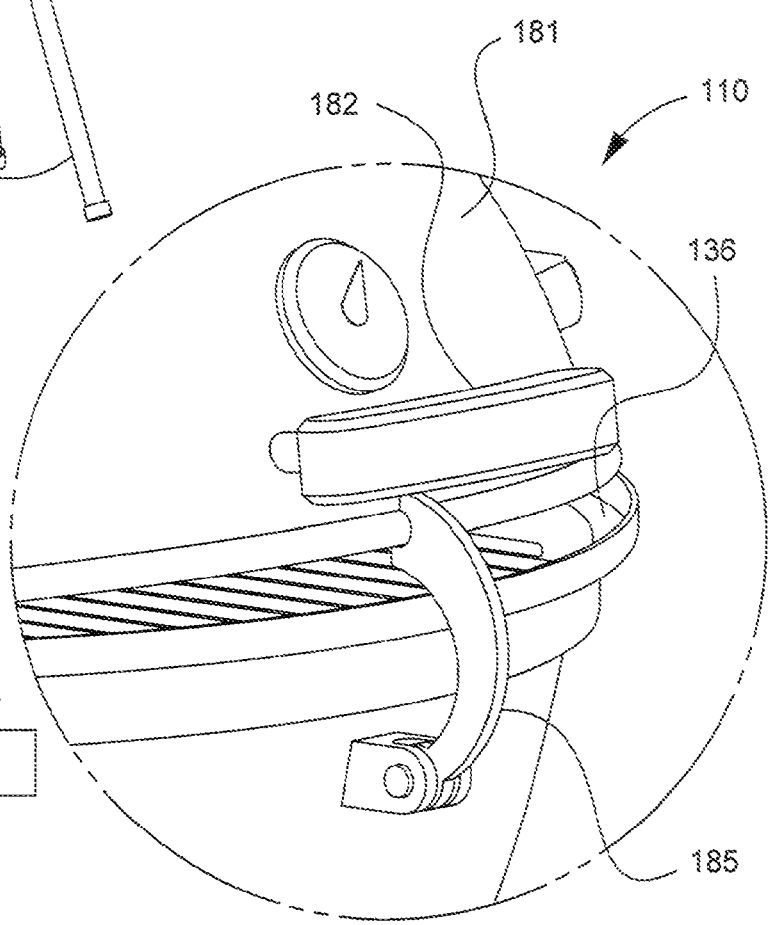
FIG. 10B is a more detailed partial view of the region A depicted in FIG. 10A, showing the spacer engaged to retain the movable lid in the partially open position.

Referring to FIGS. 10A and 10B, the grilling apparatus 110 can include a first spacer 185 and a second spacer 186 that can be used to retain the first lid portion 180 or the second lid portion 181 in a partially open position. The first spacer 185 and the second spacer 186 can be hinged spacers that can engage the lid 120 to prop open at least a portion of the lid 120. It will be appreciated that any suitable component or mechanism to retain the lid 120 in a fully or partially open position is contemplated.

Figure 12:
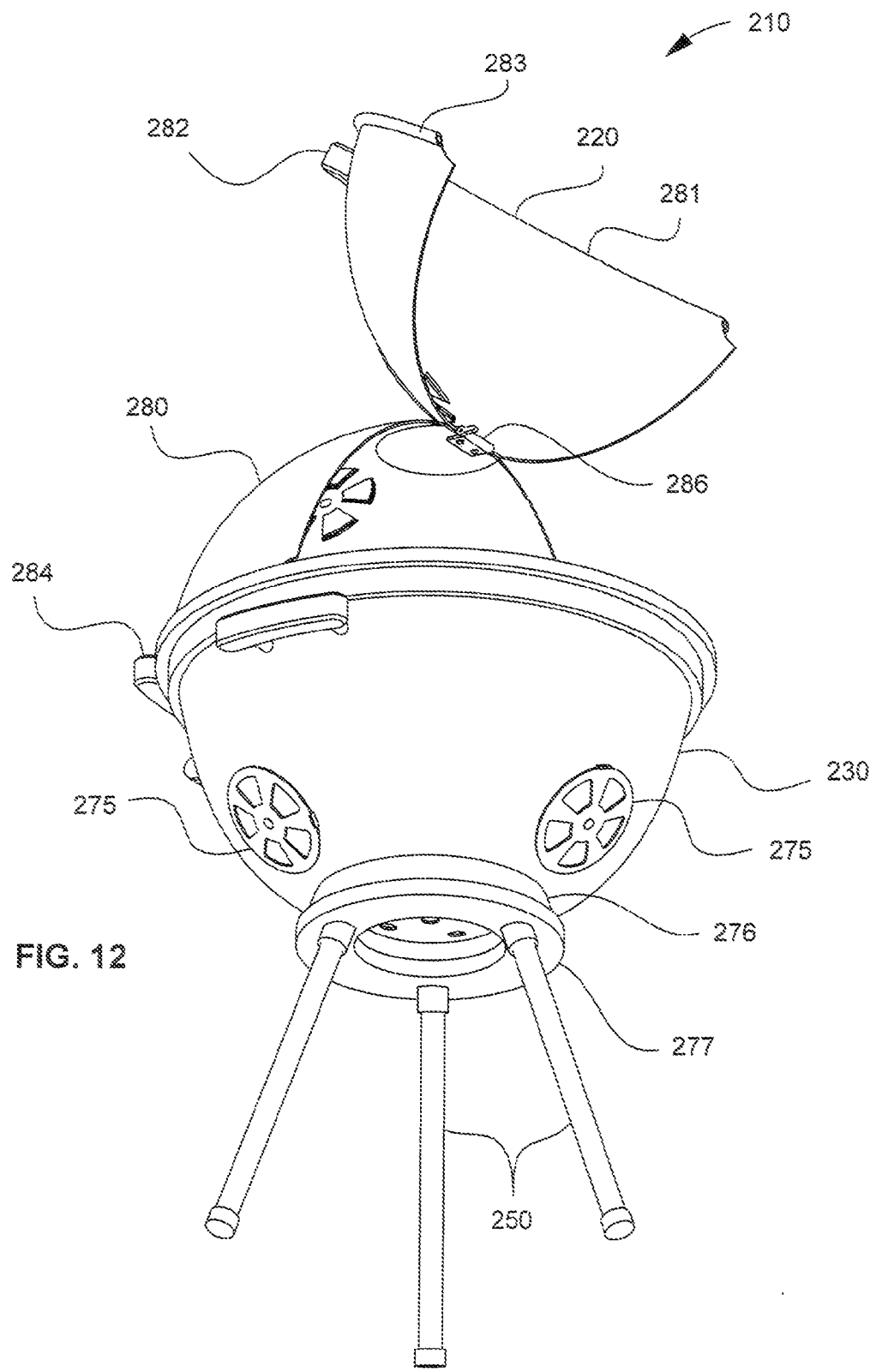
FIG. 12 is a lower perspective view of the grilling apparatus depicted in FIG. 11A.

Referring to FIGS. 11A-12, an alternate embodiment of a grilling apparatus 210 is depicted. With reference to FIG. 11A, the grilling apparatus 210 can include a lid 220 that can be associated with a bottom portion 230, a plurality of legs 250, a grate assembly 218, and a firewall 260. The lid 220 can include a first lid portion 280 and a second lid portion 281, where the second lid portion 281 can be configured to pivot relative to the first lid portion 280 at about a hinge 286, such that the lid 220 can be opened and closed. In the closed position, which is illustrated in FIG. 12, the lid 220 can substantially cover a grate 221 of the grate assembly 218. The bottom portion 230 can include a circumferential channel 236 in which the lid 220 can be seated. The grilling apparatus 210 can include a plurality of lower vents 275 that can be associated with one or a plurality of sections defined by the firewall 260, where the lower vents 275 can be used to adjust the temperature or air flow in desired sections. The grilling apparatus 210 can include an annular ring 277 and an associated swivel 276, where the swivel 276 can be configured to rotate about the axis C-C relative to the annular ring 277. The annular ring 277 can cooperate with the swivel 276 such that the upper portion of the grilling apparatus 210 can be rotated while the legs 250 remain stationary. The lid 220 can include a curled lip 283 that can facilitate rotation or movement of the lid 220.

The second lid portion 281 can include a first lid handle 282 that can be used to pivot the second lid portion 281 relative to the first lid portion 280. In an example embodiment, the first lid portion 280 can include a second handle 284 that can be used to pivot the first lid portion 280 relative to the second lid portion 281 about the hinge 286. The hinge 286 can include a tightening element 287 that can be used to secure the lid 220 in a desired position. Either half of the grilling apparatus 210 can be exposed by the user, which may be beneficial in the grilling process. For example, if a user desires a first section 212 to remain covered at all times, the user can open the lid 220 by pivoting the second lid portion 281 relative to the first lid portion 280. If the user wishes to access the first section 212, the first lid portion 280 can be pivoted relative to the second lid portion 281. It will be appreciated, in an alternate embodiment, that the first lid portion 280 or the second lid portion 281 can be fixedly coupled to the bottom portion 230 such that only one portion of the lid 220 can be configured for movement.

Figure 13:
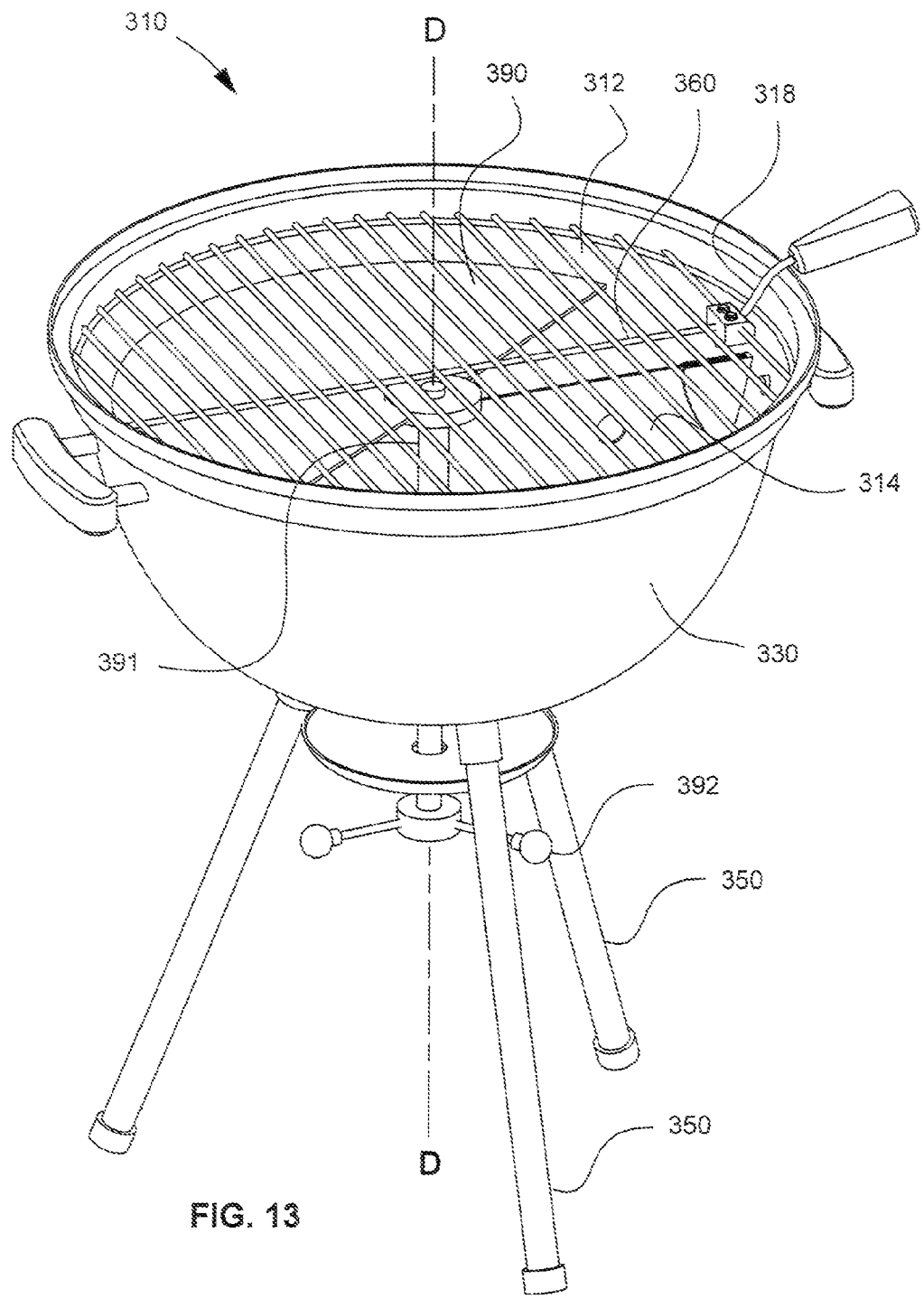
FIG. 13 is a partial perspective view of a grilling apparatus having a shield in accordance with an alternate embodiment.
Figure 14:
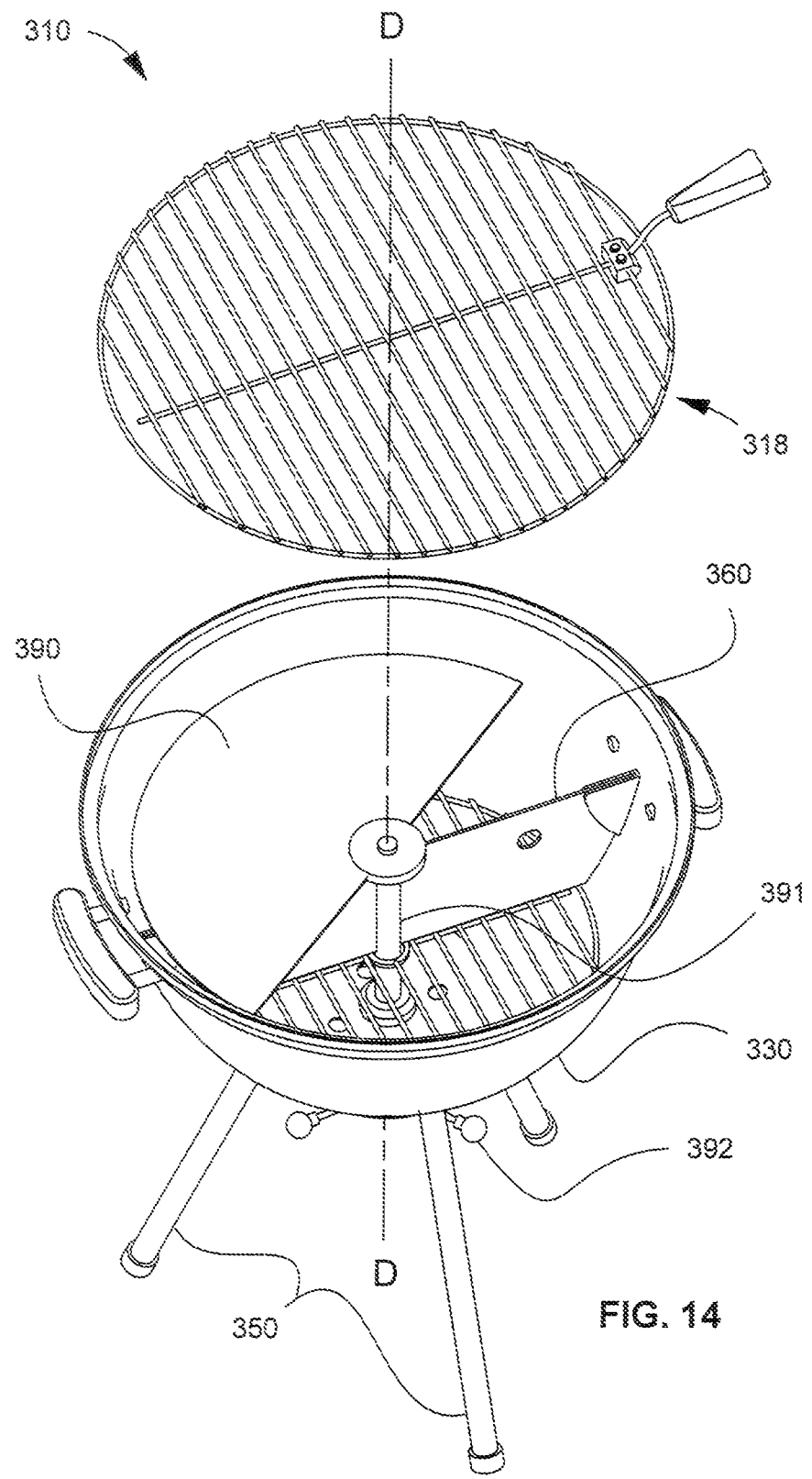
FIG. 14 is a partial exploded view of the grilling apparatus depicted in FIG. 13.

Referring to FIGS. 13 and 14, an alternate embodiment of a grilling apparatus 310 is depicted. The grilling apparatus 310 can include a lid (not shown) that can be associated with a bottom portion 330, a plurality of legs 350, a grate assembly 318, and a firewall 360. The grilling apparatus 310 can include a hemispherical shield 390 that can be coupled with a post 391, where the post 391 can be coupled with a guide 392 such that rotation of the guide 392 can correspondingly rotate the shield 390. In an example embodiment, the post 391 can have a substantially vertical orientation and can pass through the lower portion 330 such that the guide 392, which can be positioned between the legs 350, can be rotated by a user. The post 391 can be configured to pass between halves of the firewall 360. In an alternate embodiment, the firewall can define a channel (not shown) at about a central axis D-D into which the post can be placed, where the post can rotate within the channel defined by the firewall when the guide is rotated by a user.

During operation, the shield 390 can be used to prevent flare-ups from a heating element positioned, for example, in a first section 312, by rotating the shield 390 to cover the first section 312 during a flare-up. The shield 390 can be selectively rotated relative to the bottom portion 330 or the grate assembly 318 and may help control temperature, flare-ups, or otherwise provide a user with additional control over the grilling apparatus 310. It will be appreciated that any suitable size, shape, or configuration of a shield is contemplated. It will be appreciated that the shield 390 can be fixedly coupled with the bottom portion 330 or can be selectively removable from the bottom portion 330. The shield 390 can be constructed from any suitable material, can be a substantially contiguous plane of metal, can define apertures, or can include any other features or configuration. In an example embodiment, the post 391 can be coupled to interchangeable components, including the shield 390, such that other elements, components, or features can be attached to and used with the grilling apparatus 310. Shield 390 can also be configured as a cooking surface, wherein the food can be rotated between first section 312 and second section 314.

Figure 15:
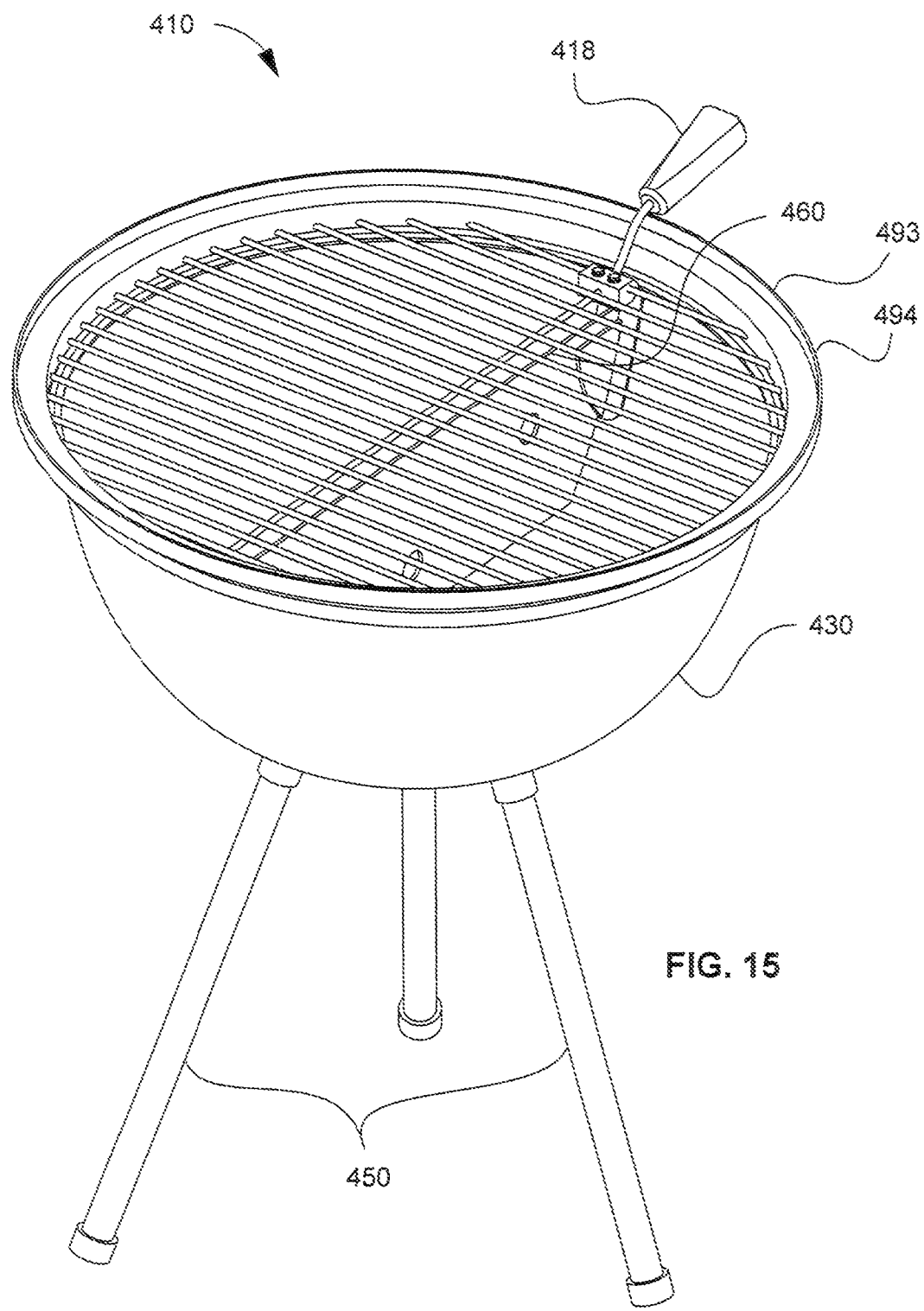
FIG. 15 is a partial perspective view of a grilling apparatus in accordance with an alternate embodiment, shown with a lower portion, a grate assembly, and a removable shield assembly.
Figure 16:
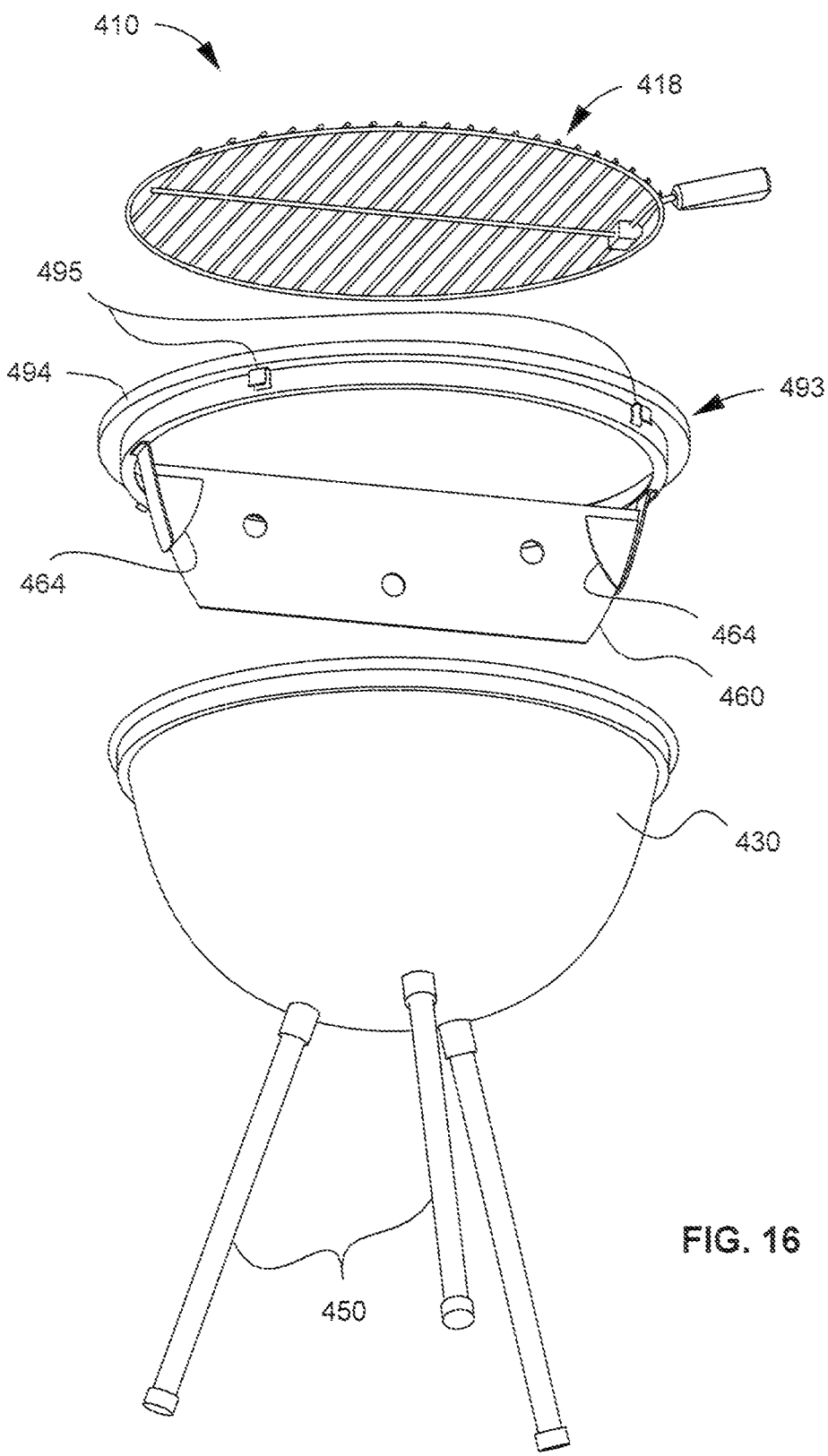
FIG. 16 is an exploded view of lower portion, grate assembly, and removable shield of the grilling apparatus depicted in FIG. 15.
Figure 17:
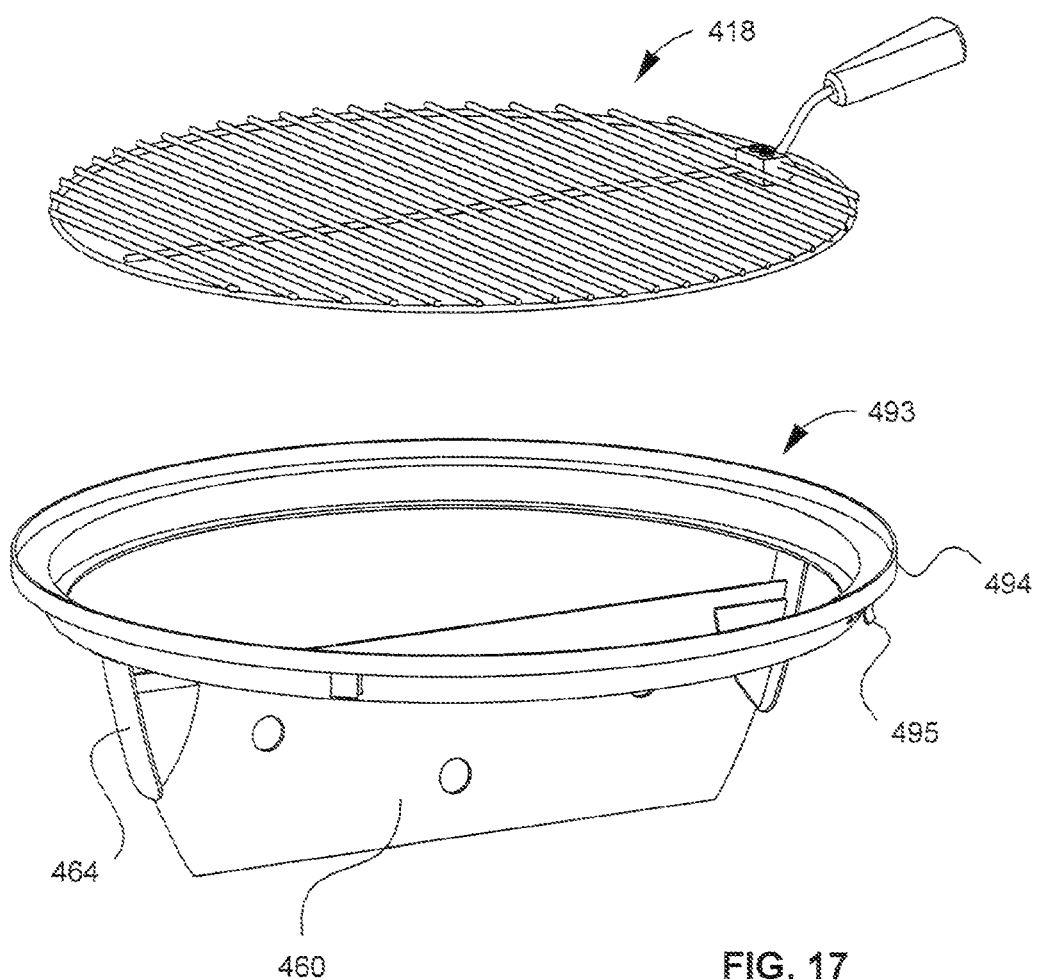
FIG. 17 is an exploded view of the grate assembly and removable shield depicted in FIG. 15.

Referring to FIGS. 15-17, an alternate embodiment of a grilling apparatus 410 is depicted. The grilling apparatus 410 can include a lid (not shown) that can be associated with a bottom portion 430, a plurality of legs 450, a grate assembly 418, and a firewall 460. Referring to FIGS. 16 and 17, The grilling apparatus 410 can include a removable firewall assembly 493 that can include an annular ring 494 that can be selectively coupled with the bottom portion 430 with, for example, a plurality of clips 495. The annular ring 494 can be coupled with at least one bracket 464 that can be configured to retain the firewall 460. In an example embodiment, the bottom portion 430 can be an existing grill, where the firewall assembly 493 can be configured to retrofit an existing grill to provide the benefits of a firewall 460. The firewall assembly 493 can be configured to retain the grate assembly 418 such that the grate assembly 418 can be rotatable relative to the bottom portion 430. In an example embodiment, the firewall 460 can be selectively removable from the at least one bracket 464. It will be appreciated that the firewall assembly 493 can include any features such as a smoker, charcoal grid, a plurality of interchangeable firewalls having different configurations, attachments to the bottom portion, or the like. In an example embodiment, the firewall assembly 493 and the grate assembly 418 can be sold as a kit for use with existing grill systems, where a variety of such kits can be provided to accommodate different sized grill systems.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A grilling apparatus comprising:
   (a) a bottom portion defining a cavity;
   (b) a firewall, the firewall positioned within the cavity defined by the bottom portion such that the bottom portion is divided into a first section and a second section, wherein the first section is configured to retain a heating element;
   (c) a movable grate, the movable grate being positioned within the bottom portion and having a first position and a second position, wherein the first position is rotationally spaced apart from the second position about a central axis of the movable grate;
   (d) a handle, the handle fixedly coupled with the movable grate such that the handle projects outwardly from the bottom portion during use, wherein the handle transitions the movable grate from the first position to the second position about the central axis of the movable grate; and
   (e) a lid configured to cover at least a portion of the movable grate, wherein the lid defines a first notch and a second notch, the first notch being opposite the second notch and positioned substantially 180 degrees around the circumference of the lid from the second notch, wherein the handle is at least partially retained within the first notch of the lid in the first position and is at least partially retained within the second notch of the lid in the second position.

2. The grilling apparatus of claim 1, wherein the firewall defines a plurality of apertures.

3. The grilling apparatus of claim 1, wherein the lid is divided into a first lid portion and a second lid portion.

4. The grilling apparatus of claim 3, wherein the first lid portion is movable relative to the first lid portion.

5. The grilling apparatus of claim 1, wherein the lid further comprises an overhang.

6. The grilling apparatus of claim 1, wherein the lid is substantially hemispherical.

7. A grilling apparatus comprising:
   (a) a bottom portion defining a cavity;
   (b) a firewall, the firewall positioned within the cavity defined by the bottom portion such that the bottom portion is divided into a first section and a second section, wherein the first section is configured to retain a heating element;
   (c) a movable grate, the movable grate being positioned within the bottom portion and having a first position and a second position, wherein the first position is rotationally spaced apart from the second position about a central axis of the movable grate;
   (d) a handle, the handle fixedly coupled with the movable grate such that the handle projects outwardly from the bottom portion during use, wherein the handle transitions the movable grate from the first position to the second position about the central axis of the movable grate;
   (e) a lid configured to cover at least a portion of the movable grate; and
   (f) a flame shield, the flame shield being rotatable relative to the movable grate, wherein the flame shield is coupled with a post and a guide, the guide projecting below the bottom portion such that a user can manipulate the guide to rotate the flame shield.

8. The grilling apparatus of claim 7, wherein the firewall defines a plurality of apertures.

9. The grilling apparatus of claim 7, wherein the lid is divided into a first lid portion and a second lid portion.

10. The grilling apparatus of claim 9, wherein the first lid portion is movable relative to the first lid portion.

11. The grilling apparatus of claim 7, wherein the lid further comprises an overhang.

12. The grilling apparatus of claim 7, wherein the lid is substantially hemispherical.

13. The grilling apparatus of claim 7, further comprising at least one vent.

14. A grilling apparatus comprising:
   (a) a bottom portion defining a cavity;
   (b) a firewall, the firewall positioned within the cavity defined by the bottom portion such that the bottom portion is divided into a first section and a second section, wherein the first section is configured to retain a heating element;
   (c) a movable grate, the movable grate being positioned within the bottom portion and having a first position and a second position, wherein the first position is rotationally spaced apart from the second position about a central axis of the movable grate;
   (d) a handle, the handle fixedly coupled with the movable grate such that the handle projects outwardly from the bottom portion during use, wherein the handle transitions the movable grate from the first position to the second position about the central axis of the movable grate; and
   (e) a lid configured to cover at least a portion of the movable grate, wherein the lid further comprises a hinged spacer that is configured to engage the bottom portion such that the lid can be spaced apart from the bottom portion.

15. The grilling apparatus of claim 14, wherein the firewall defines a plurality of apertures.

16. The grilling apparatus of claim 14, wherein the lid is divided into a first lid portion and a second lid portion.

17. The grilling apparatus of claim 16, wherein the first lid portion is movable relative to the first lid portion.

18. The grilling apparatus of claim 14, wherein the lid further comprises an overhang.

19. The grilling apparatus of claim 14, wherein the lid is substantially hemispherical.

20. The grilling apparatus of claim 14, further comprising at least one vent.

* * * * *